US008913193B2

(12) United States Patent
Fukunaka

(10) Patent No.: US 8,913,193 B2
(45) Date of Patent: Dec. 16, 2014

(54) ELECTRONIC DEVICE HAVING LANGUAGE SWITCHING FUNCTION

(75) Inventor: Kenichi Fukunaka, Osaka (JP)

(73) Assignee: Funai Electric Co., Ltd., Osaka (JP)

( * ) Notice: Subject to any disclaimer, the term of this patent is extended or adjusted under 35 U.S.C. 154(b) by 0 days.

(21) Appl. No.: 14/241,509

(22) PCT Filed: Jun. 12, 2012

(86) PCT No.: PCT/JP2012/064969
§ 371 (c)(1),
(2), (4) Date: Feb. 27, 2014

(87) PCT Pub. No.: WO2013/046812
PCT Pub. Date: Apr. 4, 2013

(65) Prior Publication Data
US 2014/0226066 A1    Aug. 14, 2014

(30) Foreign Application Priority Data

Sep. 26, 2011  (JP) ................................ 2011-208425

(51) Int. Cl.
| H04N 5/50 | (2006.01) |
| H04N 5/445 | (2011.01) |
| H04N 21/485 | (2011.01) |
| H04N 9/82 | (2006.01) |
| H04N 5/781 | (2006.01) |
| H04N 5/85 | (2006.01) |

(52) U.S. Cl.
CPC ....... *H04N 5/44513* (2013.01); *H04N 21/4856* (2013.01); *H04N 5/781* (2013.01); *H04N 2005/44539* (2013.01); *H04N 9/8233* (2013.01); *H04N 5/85* (2013.01); *H04N 2005/4453* (2013.01)
USPC ......................................... 348/569; 348/564

(58) Field of Classification Search
USPC ................ 348/734, 468, 564, 569, 598, 600;
725/32, 40, 137; 704/8, 276, 277;
386/230, 244, 245, 285; 715/810;
345/629, 437
See application file for complete search history.

(56) References Cited

U.S. PATENT DOCUMENTS

| 5,570,134 | A | * | 10/1996 | Hong .............................. 348/467 |
| 6,128,434 | A | * | 10/2000 | Hirayama et al. ............ 386/243 |
| 6,661,466 | B1 | * | 12/2003 | Kou ............................... 348/553 |
| 6,940,563 | B2 | * | 9/2005 | Ishihara ........................ 348/738 |
| 7,280,138 | B2 | * | 10/2007 | Shibutani ...................... 348/239 |

(Continued)

FOREIGN PATENT DOCUMENTS

| JP | 09-127926 A | 5/1997 |
| JP | 10-222213 A | 8/1998 |
| JP | 2001-154774 A | 6/2001 |
| JP | 2004-199343 A | 7/2004 |
| JP | 2006-54027 A | 2/2006 |
| JP | 2006-235659 A | 9/2006 |
| JP | 2010-282071 A | 12/2010 |

*Primary Examiner* — Victor Kostak
(74) *Attorney, Agent, or Firm* — Morgan, Lewis & Bockius LLP

(57) ABSTRACT

The present invention is an electronic device having a function of switching a language to be displayed on a screen, and is provided with an input unit through which a command for language switching can be inputted, and a switching processing unit which, on the basis of the command from the input unit, performs processing of switching between a first state in which the language to be displayed on the screen is displayed while being switched to a different language in a predetermined order, and a second state in which a specified language is displayed without switching the language to be displayed on the screen.

6 Claims, 4 Drawing Sheets

(56) References Cited

U.S. PATENT DOCUMENTS

| | | | |
|---|---|---|---|
| 7,742,106 B2* | 6/2010 | Ko et al. | 348/569 |
| 8,527,261 B2* | 9/2013 | Shibutani | 704/8 |
| 2002/0083453 A1* | 6/2002 | Menez | 725/47 |
| 2002/0140863 A1* | 10/2002 | Park, II | 348/569 |
| 2002/0186328 A1* | 12/2002 | Nishida et al. | 348/738 |
| 2004/0119696 A1 | 6/2004 | Amano et al. | |
| 2005/0057696 A1* | 3/2005 | Tsubokawa et al. | 348/731 |
| 2005/0285980 A1* | 12/2005 | Katayama | 348/738 |
| 2006/0034590 A1 | 2/2006 | Teramoto | |
| 2008/0178106 A1* | 7/2008 | Awada et al. | 715/765 |

* cited by examiner

FIG.5

| 1 | ENGLISH |
|---|---------|
| 2 | FRENCH  |
| 3 | SPANISH |
| 4 | GERMAN  |
| . | .       |
| . | .       |
| . | .       |

FIG.6

| 1 | JAPANESE |
|---|----------|
| 2 | ENGLISH  |
| 3 | FRENCH   |
| 4 | SPANISH  |
| . | .        |
| . | .        |
| . | .        |

ELECTRONIC DEVICE HAVING LANGUAGE SWITCHING FUNCTION

TECHNICAL FIELD

The present invention relates to an electronic device having a language switching function.

BACKGROUND ART

There are conventionally known electronic devices that have a function of switching the language of screen display (for example, English, French, German, Chinese, and Japanese). Examples of electronic devices that have a language switching function include reproduction devices that reproduce video, recording/reproduction devices that record and reproduce video, and television receivers.

In an electronic device that has a function of switching the language of screen display, if an erroneous setting is made during the setting of the language, a situation (first situation) may arise where the user does not understand the screen display. When a person different from the person who set the language uses the electronic device, a situation (second situation) may arise where the user does not understand the screen display.

A technique to cope with such situations is disclosed in Patent Document 1 listed below. With the technique disclosed in Patent Document 1, when the language specified as the OSD (on-screen display) language is changed, a screen for accepting information specifying an OSD language is displayed in both the language identified by first information which is the latest specification information and the language identified by second information which is the previous specification information.

With the technique disclosed in Patent Document 1, even when the OSD language is changed to a language that the user does not understand, the user can refer to the screen for specifying an OSD language that is displayed in the language before the change. This permits the user to set the right OSD language.

LIST OF CITATIONS

Patent Literature

Patent Document 1: Japanese Patent Application Publication No. 2010-282071

SUMMARY OF THE INVENTION

Problem to be Solved by the Invention

The technique disclosed in Patent Document 1 is considered to be particularly effective in the first situation mentioned above. However, in the second situation mentioned above, it may be that the user does not understand either of the languages identified by the first and second information, and therefore the technique disclosed in Patent Document 1 is not always effective.

Against the background discussed above, an object of the present invention is to provide an electronic device that has a language switching function such that, even when screen display is in a language that the user does not understand, the language of screen display can be easily re-set for the language that the user desires.

Means for Solving the Problem

To achieve the above object, according to the present invention, an electronic device having a function of switching the language of screen display is so configured as to include: an input acceptor adapted to accept a command as to language switching; and a switching processor adapted to switch, according to the command from the input acceptor, between a first state in which the language of screen display is switched while one language after another is displayed in a predetermined order and a second state in which a particular language is displayed without the language of screen display being switched (a first configuration).

With this configuration, by starting the first state (a state in which the language of screen display is switched while one language after another is displayed in a predetermined order) by operation of the input acceptor, the user can easily find the language that he understands. Thus, even when screen display is in a language that the user does not understand, he can easily re-set the language of screen display for the language that he desires.

Preferably, the electronic device of the first configuration described above is so configured that, when the input acceptor is held down longer than a predetermined period, the switching processor starts the first state, and that, when the input acceptor stops being held down, the switching processor ends the first state and starts the second state (a second configuration). In this configuration, the manner in which the input acceptor is pressed is so worked out as to realize a configuration that permits the user to change the language setting easily. Thus, with this configuration, by use of an existing key that is originally provided in the electronic device, it is possible to provide a user-friendly electronic device.

Preferably, the electronic device of the second configuration described above is so configured that the input acceptor is used also to execute a function other than the function of switching between the first and second states (a third configuration). For example, the input acceptor may be a STOP key or the like for stopping the operation that the electronic device is performing. Such a STOP key is typically provided in electronic devices, and by using it as the input acceptor, the user can change the setting of the language of screen display from a language that he does not understand to the language that he desires. That is, with this configuration, it is possible to provide a user-friendly electronic device at low cost.

Preferably, the electronic device of any of the first to third configurations described above is so configured that the switching processor determines an order of preference as to an order of languages of screen display based on predetermined information and changes the predetermined order according to the determined order of preference (a fourth configuration). With this configuration, it is possible to quickly switch the language of screen display to the language that the user desires.

Preferably, the electronic device of the fourth configuration described above is so configured as to further include a storage for storing information as to the frequencies of languages used, and that the predetermined information includes the information as to the frequencies of languages used (a fifth configuration).

Preferably, the electronic device of the fourth or fifth configuration described above is so configured that information as to the region of use can be set, and that the predetermined information includes the information as to the region of use (a sixth configuration).

Preferably, the electronic device of any of the fourth to sixth configurations described above is so configured that the language of subtitles displayed along with video can be set, and that the predetermined information includes information as to the language of subtitles (a seventh configuration).

Preferably, the electronic device of any of the first to seventh configurations described above is configured as one of a reproduction device that reproduces video, a recording/reproduction device that records and reproduces video, and a television receiver.

Advantageous Effects of the Invention

According to the present invention, it is possible to provide an electronic device that has a language switching function such that, even when screen display is in a language that the user does not understand, the language of screen display can be easily re-set for the language that the user desires. The present invention is suitable for, for example, reproduction devices that reproduce video, recording/reproduction devices that record and reproduce video, and television receivers.

BRIEF DESCRIPTION OF DRAWINGS

FIG. 5 is a schematic diagram showing an example of an order of languages of screen display in a language setting switching assist procedure executed by a recording/reproduction device embodying the present invention; and FIG. 6 is a diagram illustrating a modified example of a recording/reproduction device embodying the present invention.

DESCRIPTION OF EMBODIMENTS

Hereinafter, an electronic device having a language switching function embodying the present invention will be described with reference to the accompanying drawings. In the following description, as an example of an electronic device having a language switching function embodying the present invention, a recording/reproduction device that records and reproduces video will be dealt with.

Figure 1:
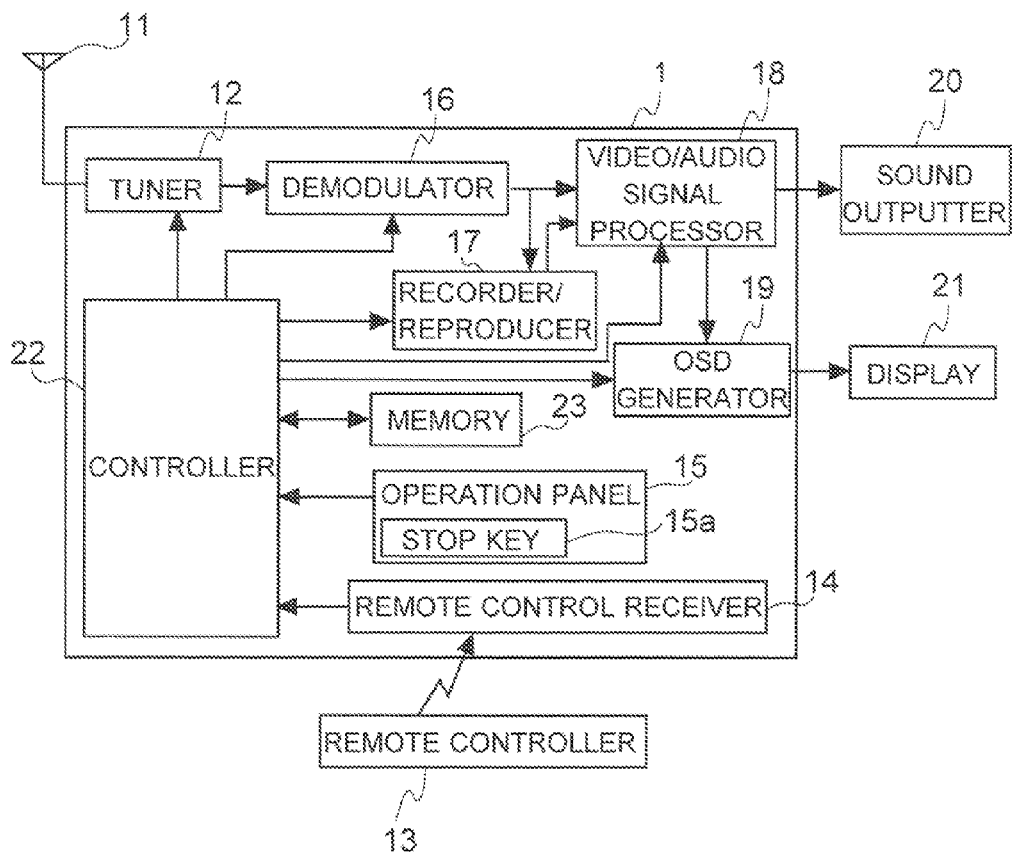
FIG. 1 is a block diagram showing a configuration of a recording/reproduction device embodying the present invention.

FIG. 1 is a block diagram showing the configuration of the recording/reproduction device 1 embodying the present invention. The recording/reproduction device 1 receives a television broadcast signal via an antenna 11. The television broadcast signal received via the antenna 11 is fed to a tuner 12. The recording/reproduction device 1 also receives, via a remote control receiver 14, a signal emitted from a remote controller 13 which accepts operation by user and transmits a command signal according to the operation. The remote control receiver 14 is electrically connected to a controller 22 so that the former can feed signals to the latter. The signal emitted from the remote controller 13 may be an optical signal, such as an infrared signal, or a wireless signal (a radio-wave signal).

So that the recording/reproduction device 1 can receive a command from the user independently of the remote controller 13, the recording/reproduction device 1 is also provided with an operation panel 15 on its own body (for example, on the front panel of the device body). The operation panel 15 is provided with a plurality of keys, such as a START key for starting reproduction and a STOP key 15a for stopping reproduction. The operation panel 15 is electrically connected to the controller 22 so that the former can feed signals to the latter.

The tuner 12 selects, from television broadcast signals received via the antenna 11, a reception channel that corresponds to an instruction from the controller 22. The tuner 12 then feeds the television broadcast signal of the selected channel to a demodulator 16. The demodulator 16 demodulates, out of the television broadcast signal of the selected channel, a video/audio signal containing a video signal and an audio signal. The demodulated video/audio signal can be fed to a recorder/reproducer 17 and to a video/audio signal processor 18.

The recorder/reproducer 17 includes a hard-disk drive (HDD), and an optical disc device which allows recording of information to an optical disc and reproducing of information recorded on an optical disc. Examples of optical discs include Blu-ray discs (BDs) and digital versatile discs (DVDs). The optical disc device includes a well-known optical pickup. The recorder/reproducer 17, when given a command to record from the controller 22, performs recording by recording the video/audio signal fed from the demodulator 16 to a recording medium such as the HDD or an optical disc. The recorder/reproducer 17, when given a command to reproduce from the controller 22, reads a video/audio signal recorded on the HDD or an optical disc and feeds it to the video/audio signal processor 18.

The video/audio signal processor 18 separates the video/audio signal fed to it into a video signal and an audio signal. The video signal is fed to an OSD (on-screen display) generator 19. The OSD generator 19 generates an image signal based on data fed from the controller 22, and outputs the image signal, in a form superimposed on the video signal, to a display 21. The display 21 comprises a liquid crystal display, a plasma display, or the like. The audio signal obtained in the video/audio signal processor 18 is reproduced as sound from a sound outputter (speaker) 20.

The controller 22 is electrically connected to different sections provided in the recording/reproduction device 1, and controls the entire device. The programs and the like that are necessary for the controller 22 to execute different kinds of control operation are stored in a memory 23. The memory 23 includes ROM (read-only memory) and RAM (random-access memory).

The configuration of the recording/reproduction device 1 in this embodiment is, in outline, as described above. Next, the distinctive features of the recording/reproduction device 1 will be described.

Figure 2:
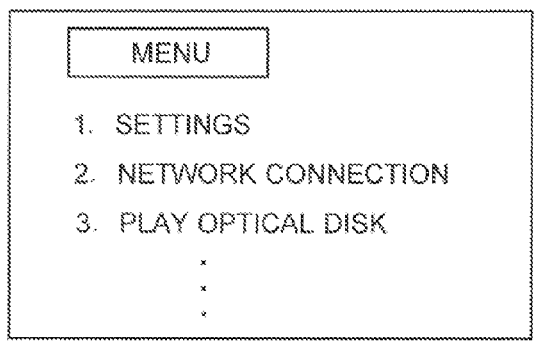
FIG. 2 is a schematic diagram showing an example of a menu screen that can be shown by a recording/reproduction device embodying the present invention.
Figure 3:
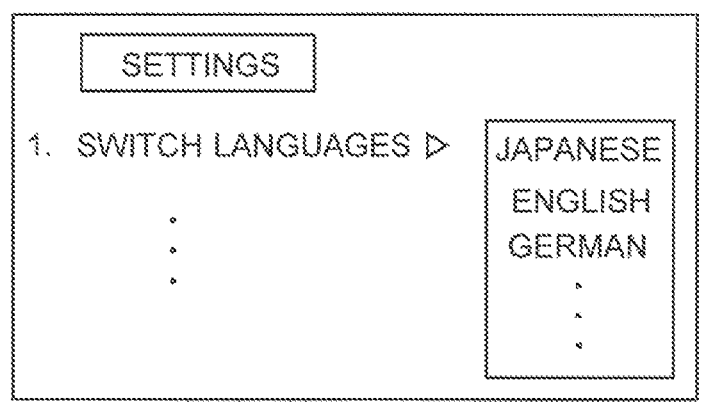
FIG. 3 is a schematic diagram showing an example of a language switching screen shown by a recording/reproduction device embodying the present invention.

In response to the user's operation on the remote controller 13 or the operation panel 15, under the control of the controller 22, the recording/reproduction device 1 can display a menu screen as shown in FIG. 2 on the display 21 (on an OSD basis). When the user selects "Settings" on the menu screen (such a selection can be made, for example, by operating the remote controller 13), under the control of the controller 22, the recording/reproduction device 1 can display a language switch screen as shown in FIG. 3. That is, the recording/reproduction device 1 is so configured as to have a function of switching the language of display on the display 21.

The language switching here denotes the switching of the language that is used in screen display, as on a menu screen or on a set-up screen, for entering settings and instructions with respect to the recording/reproduction device 1. That is, the language switching here is different from the switching of the language of the subtitles superimposed on the video reproduced from an optical disc or on the video of a television broadcast.

The initially set language which is used in the above-mentioned menu screen and the like is determined, for example, with consideration given to the geographical region or the like in which the recording/reproduction device 1 is sold (used). Specifically, for example, when the recording/reproduction device 1 is expected to be used in Japan, the initially set language is determined to be Japanese; when the recording/reproduction device 1 is expected to be used in the United States or in Europe, the initially set language is determined to be, typically, English.

For example, on the above-mentioned language setting screen, the user may make a wrong language setting, invoking screen display in a language that the user does not understand. For another example, when the initial language is set not for a single country but for a geographical region covering a plurality of countries like Europe as mentioned above, depending on the country in which the device is sold (for example, a state where English is not used officially), the user may not understand the initially set language (for example, English).

Figure 4:
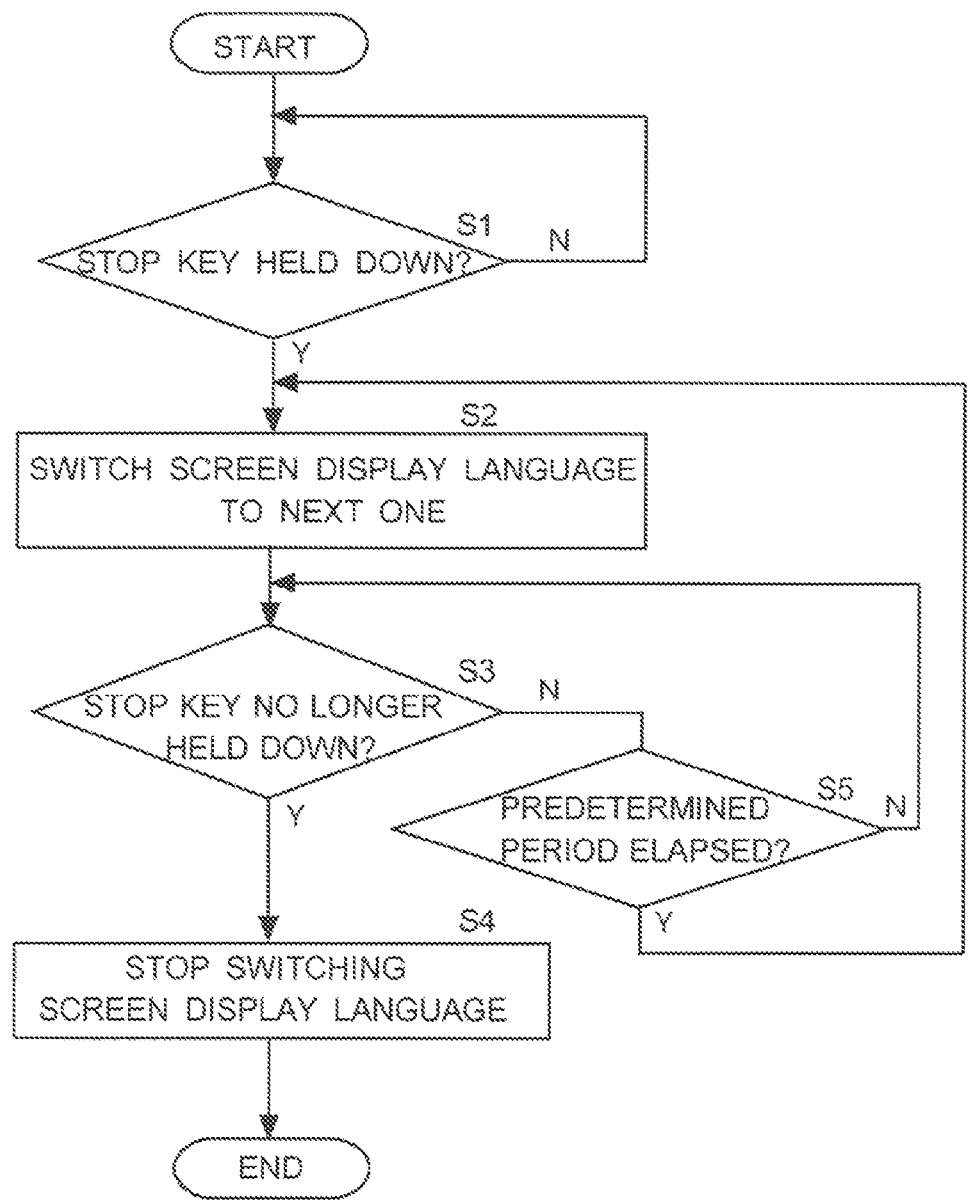
FIG. 4 is a flow chart showing a flow of a procedure executed by a recording/reproduction device embodying the present invention to assist switching of a language setting.

To help the user out of situations as mentioned above (situations where the user does not understand the language of display screen), the recording/reproduction device 1 is so configured as to allow easy switching of the language setting. FIG. 4 is a flow chart showing the flow of the procedure (hereinafter also referred to as the "language setting switching assist procedure") executed by the recording/reproduction device 1 embodying the present invention to assist switching of the language setting. Now, with reference to FIG. 4, the language setting switching assist procedure executed by the recording/reproduction device 1 will be described.

For example, while a screen for entering a setting or an instruction with respect to the recording/reproduction device 1 (such as a menu screen or a set-up screen) is being displayed, the controller 22 monitors whether or not the STOP key 15a included in the operation panel 15 is held down (step S1). Here, the STOP key 15a being held down denotes it being kept pressed longer than a previously set predetermined period (for example, two seconds).

On detecting the STOP key 15a being held down, the controller 22 controls the OSD generator 19 to switch the current language of screen display to the next one in a previously set order (step S2). The order in which languages for screen display are switched is prepared in the form of a table as shown in FIG. 5 and is previously stored in the memory 23. For example, if the language of screen display at the time point that the STOP key 15a starts being held down is Japanese, then, according to FIG. 5, the language of display in a menu screen and the like is switched from Japanese to English.

Next, the controller 22 checks whether or not the STOP key 15a, which was detected to be held down at step S1, has stopped being held down (step S3). If the STOP key 15a is no longer held down ("Yes" at step S3), the controller 22 ends the switching of the language of screen display (step S4). For example, when the user wants to switch the language of screen display to English, by stopping holding down the STOP key 15a while English is being displayed as the language of screen display, he can have the menu screen or the like displayed in English.

On the other hand, if the STOP key 15a continues being held down ("No" at step S3), the controller 22 checks whether or not a predetermined period (for example, one second) has elapsed after the language of screen display was switched at step S2 (step S5). If the predetermined period has not elapsed ("No" at step S5), the flow returns to step S3. If the predetermined period has elapsed ("Yes" at step S5), the flow returns to step S2, where the language of screen display is switched to the further next language. In the example shown in FIG. 5, the language of screen display is switched from English to Spanish.

That is, according to the language setting switching assist procedure executed by the recording/reproduction device 1, as long as the STOP key 15a continues being held down, the language used for screen display is switched from one to the next in a predetermined order (for example, in the order shown in FIG. 5) at predetermined time intervals. By stopping holding down the STOP key 15a while the language used for screen display is the language that the user wants to set, the user can switch the language of screen display to the language that he desires. Thus, even when screen display is in a language that the user does not know (does not understand), the user can easily re-set the language of screen display for the language he desires.

The language setting switching assist procedure executed by the recording/reproduction device 1 can be executed not only when no reproduction or recording is being performed but also when reproduction or the like is being performed. In a case where a configuration is adopted that permits the language setting switching assist procedure to be performed while reproduction or the like is being performed, it is preferable to prepare a separate OSD screen that is used for the language setting switching assist procedure.

The embodiment described above is merely an example of, and therefore is not meant to limit, how the present invention is implemented.

For example, although the embodiment described above deals with a configuration where holding down the STOP key 15a starts the language setting switching assist procedure, this is not meant to limit the scope of application of the present invention. Specifically, any key other than the STOP key 15a provided on the operation panel 15 or the remote controller 13 may be used instead of the STOP key 15a. In a case where, as mentioned above, a configuration is adopted that permits the language setting switching assist procedure to be performed while reproduction or the like is being performed, it is preferable to use a key different from the STOP key 15a.

A key dedicated to the language setting switching assist procedure may be provided. It is however preferable to share an existing key (for example, the STOP key 15a has the function of stopping reproduction) as the key for language setting switching assist procedure. This helps avoid increasing the number of operation keys, and is expected to provide benefits such as suppressing the device cost.

Although the embodiment described above deals with a configuration where the order in which languages of screen display are switched in the language setting switching assist procedure is fixed to a previously set order, this is not meant to limit the scope of application of the present invention. Specifically, the controller 22 (switching processor) may appropriately determine an order of preference as to the order of display of languages based on predetermined information, and according to the determined order of preference, the controller 22 may appropriately change the previously set order (the order set by default). With this configuration, the language of screen display can be switched quickly from a language that the user does not understand to the language that the user desires.

The predetermined information may be, for example, information as to the frequencies with which the user selects languages for screen display (the frequencies with which languages are used on the device). In this case, it is preferable to adopt a configuration where data on the frequencies with which the user selects languages for screen display is stored and accumulated in the memory 22 (an example of a storage according to the present invention). When the user uses, in the language setting on the recording/reproduction device 1, Japanese a predetermined number of times (for example, five times) successively, the controller 22 gives Japanese the first position in the order of display of languages. In a case where the initial language settings are as shown in FIG. 5, they are changed, for example, as shown in FIG. 6, where Japanese is set as the language that is displayed first. The timing of the change may be arbitrary, such as when the controller 22 has detected the same language being set a predetermined number of times successively, before the power is turned off after the detection, or when the power is turned on the next time after the detection.

The predetermined information may be information as to the region of use that can be set on the recording/reproduction device 1. In this case, at the time point that the region of use is set, the language corresponding to that region may be given the first place in the order of display of languages.

The predetermined information may be information as to the language of subtitles that can be set on the recording/reproduction device 1. Here, the language of subtitles denotes the language that is displayed on an OSD basis to aid understanding of video and audio during reproduction from an optical disc or viewing of a television broadcast. In this case, at the time point that a setting for subtitles is made, the language of subtitles may be given the first place in the order of display of languages.

The predetermined information that the controller 22 uses when changing the order of display of languages may be one kind of information or a combination of a plurality of kinds of information. In a case where the predetermined information comprises a plurality of kinds of information, for example, the plurality of kinds of information may be used with levels of preference assigned to them.

Although the embodiment described above deals with a case where the present invention is applied to a recording/reproduction device, the present invention finds wide application in electronic devices having the function of switching the language of screen display. For example, the present invention finds application in reproduction devices that reproduce video and in television receivers. The present invention finds application also, for example, digital cameras and telephones.

INDUSTRIAL APPLICABILITY

The present invention is suitable for, for example, reproduction devices that reproduce video, recording/reproduction devices that record and reproduce video, and television receivers.

List of Reference Signs
 1 recording/reproduction device (electronic device capable of switching languages)
 15a STOP key (input acceptor)
 22 controller (switching processor)
 23 memory (storage)

The invention claimed is:

1. An electronic device having a function of switching a language used for on-screen display of an instruction to the electronic device, the electronic device comprising:
   an input acceptor adapted to accept a command as to language switching; and
   a controller adapted to allow selection between a first setting method and a second setting method as a method for setting the language to be used for on-screen display,
   wherein
   the first setting method is a method that allows the language to be used for on-screen display to be selected from a plurality of alternatives displayed on a screen by use of the input acceptor,
   the second setting method is a method that, when the input acceptor accepts a first operation, performs on-screen display while switching the language used for on-screen display from one language to another sequentially in a predetermined order at predetermined time intervals and that, when the input acceptor accepts a second operation after the first operation, stops the switching of the language and adopts as the language to be used for on-screen display the language used when the switching is stopped, and
   the electronic device is one of a reproduction device that reproduces video, a recording/reproduction device that records and reproduces video, and a television receiver.

2. The electronic device according to claim 1, wherein
   the first operation is a continuous press of a predetermined button, and
   the second operation is a release of the predetermined button from the press.

3. The electronic device according to claim 1,
   wherein the controller determines an order of preference as to an order of languages of screen display based on predetermined information, and changes the predetermined order according to the determined order of preference.

4. The electronic device according to claim 3, further comprising a storage for storing information as to frequencies of languages used, wherein the predetermined information includes the information as to the frequencies of languages used.

5. The electronic device according to claim 3, wherein the electronic device is configured such that information as to a region of use can be set, and the predetermined information includes the information as to the region of use.

6. The electronic device according to claim 3, wherein the electronic device is configured such that a language of subtitles displayed along with video can be set, and
   the predetermined information includes information as to the language of subtitles.

* * * * *